US012715110B2

(12) United States Patent
Monti

(10) Patent No.: US 12,715,110 B2
(45) Date of Patent: Aug. 25, 2026

(54) MOVEMENT SYSTEM OF A PICK AND PLACE ROBOT

(71) Applicant: Marchesini Group S.P.A., Pianoro (IT)

(72) Inventor: Giuseppe Monti, Pianoro (IT)

(73) Assignee: Marchesini Group S.P.A., Pianoro (IT)

( * ) Notice: Subject to any disclaimer, the term of this patent is extended or adjusted under 35 U.S.C. 154(b) by 356 days.

(21) Appl. No.: 18/264,122

(22) PCT Filed: Feb. 9, 2022

(86) PCT No.: PCT/IB2022/051154
§ 371 (c)(1),
(2) Date: Aug. 3, 2023

(87) PCT Pub. No.: WO2022/172168
PCT Pub. Date: Aug. 18, 2022

(65) Prior Publication Data

US 2024/0123604 A1 Apr. 18, 2024

(30) Foreign Application Priority Data

Feb. 11, 2021 (IT) ........................ 102021000002999

(51) Int. Cl.
*B25J 5/02* (2006.01)
*B25J 9/00* (2006.01)
*B25J 9/10* (2006.01)

(52) U.S. Cl.
CPC ............... *B25J 5/02* (2013.01); *B25J 9/0009* (2013.01); *B25J 9/104* (2013.01)

(58) Field of Classification Search
CPC ............. B25J 9/0009; B25J 9/104; B25J 5/02
USPC ........................................... 74/89.22; 901/21
See application file for complete search history.

(56) References Cited

U.S. PATENT DOCUMENTS

2005/0061092 A1 3/2005 Meier

FOREIGN PATENT DOCUMENTS

ES 2749455 T3 * 3/2020 ............... H01Q 3/08
JP 2001267393 A 9/2001
JP 4766274 B2 9/2011

* cited by examiner

*Primary Examiner* — T. Scott Fix
(74) *Attorney, Agent, or Firm* — Jacob M. Ward; Ward Law Office LLC

(57) ABSTRACT

The movement system (100) of a robot (RT) in alternating translation along a translation direction (Z), comprises: a carriage (1) that bears the robot (RT); a longitudinal sliding guide rail (10) on which the carriage (1) is slidably mounted, and movement means (2) of the carriage (1) along the guide rail (10). The movement means (2) comprise: a first idle pulley (21) with a first annular groove (210); a second idle pulley (22) with a second annular groove (220); a drive pulley (23) with a third annular groove (231) and a fourth annular groove (232); a first cable (24), constrained to a first point of the carriage (1) and to a first anchoring point (A1) present in the drive pulley (23); a second cable (25), constrained to a second point of the carriage (1) and to a second anchoring point (A2) present in the drive pulley (23).

10 Claims, 3 Drawing Sheets

MOVEMENT SYSTEM OF A PICK AND PLACE ROBOT

FIELD OF THE INVENTION

The present invention concerns the technical sector relating to pick-up and transfer devices of articles, known as robots of the pick and place, or anthropomorphic, type, which are predisposed to pick up one or more articles from a first position, and to transfer them, possibly by rotating them and/or stacking them, to a second position.

In particular, the present invention concerns a movement system of a robot of the pick and place, or anthropomorphic type.

DESCRIPTION OF THE PRIOR ART

Use of a robot of the pick and place or anthropomorphic type is known, for carrying out the pick-up of articles, which are for example moved according to an advancement direction by means of a transport line (for example a conveyor belt), and for transferring and releasing the articles at a release position, for example constituted by an infeed line of a packaging machine of articles internally of relative packages.

For example, in an application of the pick and place robot, these can be used to pick up blister packs which are transported by a first conveyor belt, in arrival from a blister machine, and to transfer the blister packs, possibly stacking them one on another, on a second conveyor belt, for supplying a boxing machine arranged to insert the blister packs into relative boxes.

This type of robot usually comprises a gripping element, for picking up and releasing one or more articles, which is borne by a series of arms which are hinged to one another and drivable in rotation with respect to one another about the relative hinge axes, in such a way as to be able to move the gripping element in three-dimensional space according to a plurality of movement axes.

In order to be able to carry out the pick-up of articles transported by a transport line, the robots must be translatable parallel to the transport line in order to be positioned at the point in which the article to be picked up is located.

Further, when the transport line is activated in continuous mode, the robots must be translatable parallel to the transport line so that the gripping element can follow the article to be picked up, be positioned above the article, and pick up while it is in movement.

For this purpose, movement systems are known for translating the robots in a translation direction parallel to the transport line which transports the articles to be picked up, or other types of transfer means of articles, such as for example a channel or a vibrating plane.

FIG. 1 illustrates a movement system of a pick and place, or anthropomorphic robot, according to the prior art.

The translation system (S) comprises a carriage (C), or a platform, for supporting the robot (R), and a sliding guide (G).

The carriage (C), which bears the robot (R), is mounted slidably on the sliding guide (G).

The sliding guide (G) must be arranged in such a way as to be parallel to the transport line (L) (schematically illustrated in FIG. 1) of the articles to be picked up.

The translation system (S) further comprises a cogged belt (D) wound in a closed loop about a pair of cogged pulleys (P, M), of which at least one pulley (M) is a drive pulley as it is connected to a motor (not illustrated).

The carriage (C) which bears the robot (R) is constrained to the upper branch (DS) of the cogged belt (D).

In this way, by driving the drive pulley (M) in rotation in a first rotation direction (V1) (for example in a clockwise direction, looking at FIG. 1), the upper branch of the cogged belt (D) will be activated in translation according to a first translation direction (T1), and instead activating the drive pulley (M) in a second rotation direction (V2) (for example in an anticlockwise direction, looking at FIG. 1), the cogged belt (D) will be activated in translation according to a second translation direction (T2), opposite the first translation direction (T1).

Therefore, the robot (R) can be translated, in two opposite directions and parallel to the transport line (L), in order to be positioned in a positioned flanked to the transport line (L) at the position on the transport line (L) of the article to be picked up.

Further, in a case where the transport line (L) is activated in continuous mode, the robot (R) can be translated to follow the article to be picked up and enable the gripping element to be positioned, with a nil relative velocity, above the article, so as to pick it up.

Once the article has been gripped and picked up from the transport line, the robot can be translated by means of the belt so as to be positioned in a position facing a release position of the article, which for example can be constituted by a second transport line.

In a case in which the second transport line is also driven in continuous mode, the release of the article thereon by the robot must take place with the robot being translated to follow the release position on the second line so that the gripping element, during the release step of the article, has a nil relative velocity with respect to the velocity of the second transport line.

A movement system of this type, for the translation of a pick and place, or anthropomorphic robot, while it has been shown to be substantially reliable for the movement of the robot, including in those cases in which the pick-up and release of articles is to be done in continuous mode, this leads to some drawbacks, mainly dictated by the use of a cogged belt.

Firstly there is a problem of dimensioning of the cogged belt, which is dictated by the load (the weight of the robot, and also of the articles that are to be picked up and transferred) as well as the velocity with which the robot is to be translated.

If the load or the velocity increase, the width of the belt will have to be increased (and therefore a belt of adequate width will have to be arranged on the pulleys), with a consequent increase in size.

In a case where it was not desired to use a belt with a greater width, it will be necessary to proceed with the arranging of a belt having a greater pitch in the cogging.

The increase in the pitch of the cogged belt, although, it can have a negative influence on the sliding of the carriage on the relative guide, as the cogged belt, with the increased pitch, will wind/unwind from the two pulleys, describing a polygonal curve (in substance the carriage can be translated in steps along the relative guide).

To avoid this drawback, pulleys having a greater diameter could be used, though there would then be other drawbacks relating to size.

Further, the pulleys must be mounted very precisely in such a way that the relative rotation axes are, in the horizontal plane containing them, perfectly parallel to one another.

In fact, in the case of dealignment, the cogged belt will not be able to be perfectly tensioned, nor will the relative upper branch be straight, with a consequent repercussion on the smooth sliding of the carriage along the relative guide.

Further, the rotation axes of the pulleys must be perpendicular to the vertical plane which contains the sliding guide of the carriage.

In the opposite case, the sliding of the carriage along the guide will lead to a lateral stress on the upper branch of the belt and therefore a longitudinal displacement of the cogs of the belt with respect to the cogging of the two pulleys, Further, the belt will be cyclically stressed in traction each time the carriage nears one of the two pulleys, thus changing the distance thereof from the axes of the two pulleys.

SUMMARY OF THE INVENTION

The aim of the present invention is therefore to provide a novel movement system of a robot of the pick and place, or anthropomorphic type, able to obviate the above-mentioned drawbacks of the prior art.

The above aims are attained with a movement system of a pick and place, anthropomorphic robot, according to the claims.

BRIEF DESCRIPTION OF THE DRAWINGS

The characteristics of preferred, but not exclusive, embodiments of the movement system of a robot of the pick and place, or anthropomorphic type, of the present invention will be described in the following with reference to the appended tables of drawings, in which.

Figure 1:
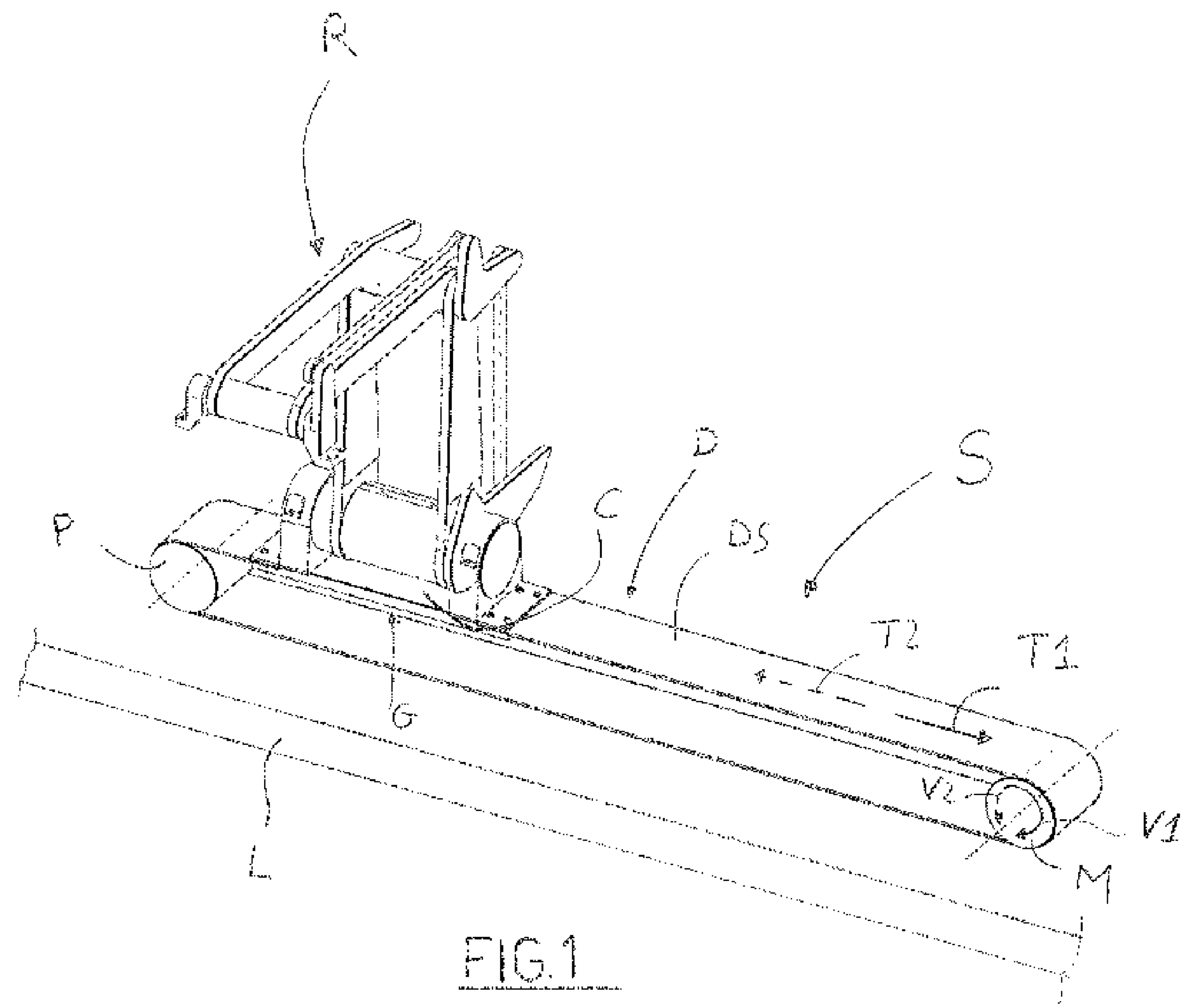
FIG. 1, mentioned in the foregoing, illustrates, in a schematic perspective view, a movement system of a robot according to the prior art.

With reference to the appended tables of drawings, reference numeral (100) denotes the movement system of a robot (RT) of the pick and place, or anthropomorphic, type, object of the present invention, in its entirety.

The movement system (100) is realised and configured for moving the robot (RT) in alternating translation along a translation direction (Z).

The robot (RT) which is moved by the movement system (100) of the invention is a robot comprising a series of arms hinged to one another and drivable in rotation with respect to one another about the relative hinge axes and provided with a gripping element, for picking up and releasing one or more articles.

The robot itself is not part of the movement system, though the movement system is specially realised and utilisable for the movement of robots of the above-described type, i.e. robots of the pick and place, or anthropomorphic, type.

The robots must be translatable alternatingly, along a translation direction in order to be positioned in a position facing the position in which an article to be picked up is located, generally transported by a transport line, so that the gripping element can be positioned above the article and pick the article up.

Once picked up, the article must be transferred and released at a release position, for example, on a second transport line.

Therefore the robot must be newly translated along the translation direction in order to be positioned in a position facing the release position and the gripping means positioned above the position so as to release the article.

The pick-up and release operations can also take place in continuous mode, that is, while the robot is moved in translation along the translation direction both during the pick-up and during the release of the article.

The movement system (100) comprises:

- a carriage (1) that bears the robot (RT);
- a longitudinal sliding guide rail (10), the carriage (1) that bears the robot (RT) being mounted slidably on the guide rail (10),
- movement means (2), which are configured and arranged to move the carriage (1) that bears the robot (RT), and thus the robot, in alternating translation along the guide rail (10) and thus along a translation direction (Z).

The special characteristics of the movement system (100) of the present invention consist in the special embodiment and configuration of the movement means (2) of the carriage (1) that bears the robot (RT).

The movement means (2) comprise:

- a first pulley (21), mounted idle about a first rotation axis (R1);
- a second pulley (22), mounted idle about a second rotation axis (R2);
- a drive pulley (23), drivable in rotation about a third rotation axis (R3).

Figure 2:
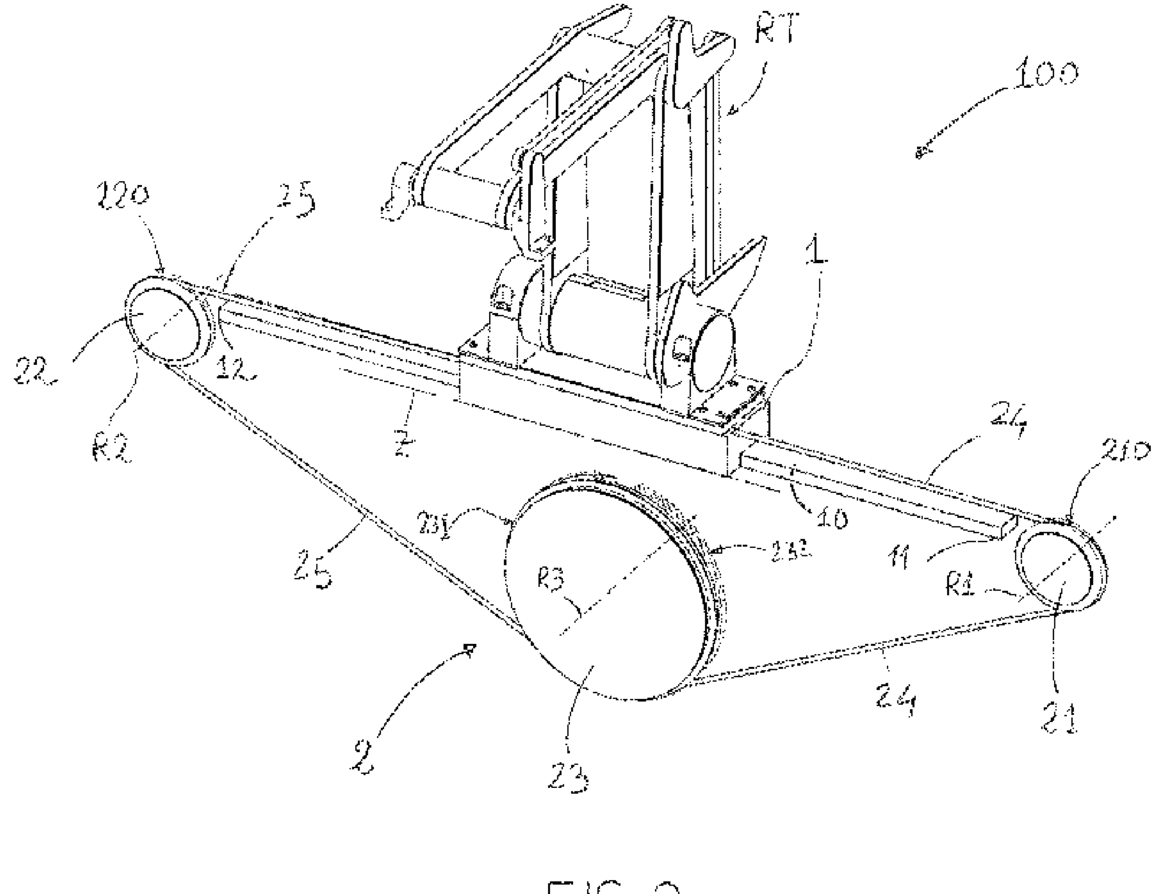
FIG. 2 schematically illustrates, in a perspective view, the movement system of a robot, of the pick and place or anthropomorphic type, according to the invention.

In greater detail (see for example FIG. 2), the first pulley (21) is arranged in proximity of a first end (11) of the guide rail (10) and the second pulley (22) is arranged in proximity of a second end (12) of the guide rail (10).

The first pulley (21) and the second pulley (22) are arranged in such a way that the respective first rotation axis (R1) and second rotation axis (R2) are parallel to one another and contained in a horizontal plane parallel to the guide rail (10).

The drive pulley (23) is arranged inferiorly of the guide rail (10) and with the respective third rotation axis (R3) being parallel to the first rotation axis (R1) of the first pulley (21) and the second rotation axis (R2) of the second pulley (22).

The first pulley (21) is conformed in such a way as to comprise a first annular groove (210) coaxial to the first rotation axis (R1), and the second pulley (22) is conformed in such a way as to comprise a second annular groove (220) coaxial to the second rotation axis (R2).

In turn, the drive pulley (23) is conformed in such a way as to comprise a third annular groove (231) and a fourth annular groove (232), parallel to one another and coaxial to the third rotation axis (R3).

Figure 3:
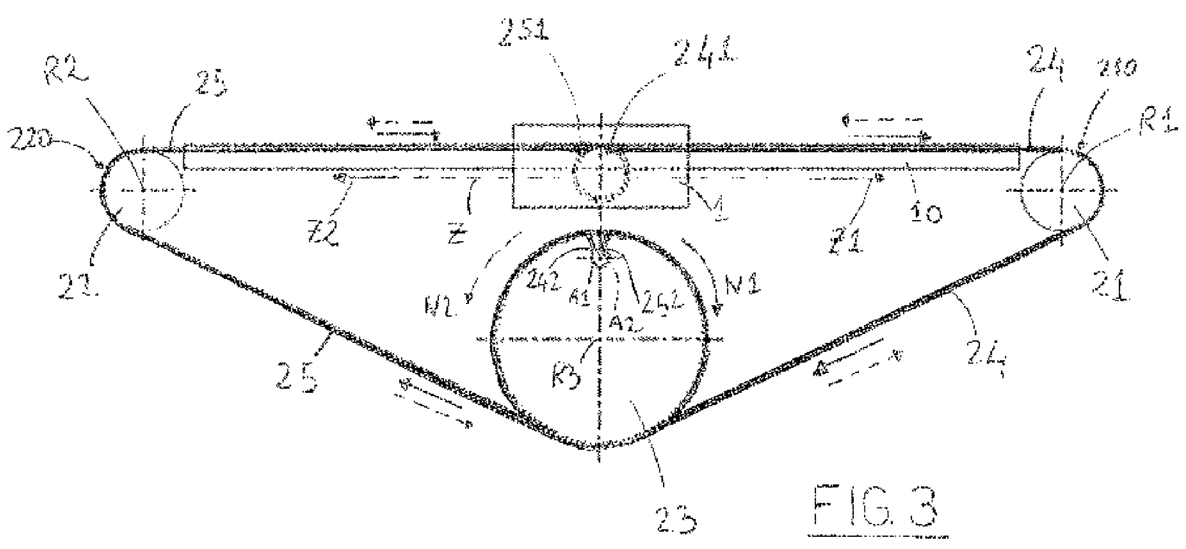
FIG. 3 is a lateral plan view of the movement system of the invention.
Figure 4:
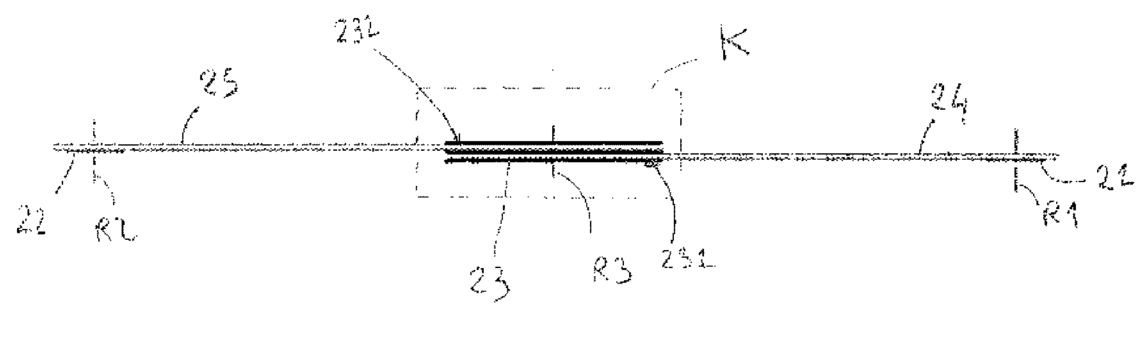
FIG. 4 is a plan view from below of some significant components of the movement system of FIG. 2.
Figure 5:
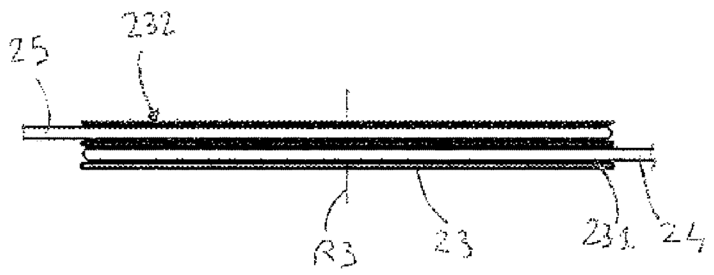
FIG. 5 is a larger-scale illustration of detail K of FIG. 4.

The movement system (100) of the invention is such that the movement means (2) further comprise (see for example FIG. 3):

- a first cable (24), which is constrained at a respective first end (241) to a first point of the carriage (1) that bears the robot (RT) and at a second end (242) to a first anchoring point (A1) present in the drive pulley (23), in such a way that the first cable (24) is partly wound about the first pulley (21) within a portion of the first annular groove (210) and a part of the first cable (24) is wound about the drive pulley (23) within a portion of the third annular groove (231);

a second cable (25), which is constrained at a respective first end (251) to a second point of the carriage (1) that bears the robot (RT), opposite the first point with respect to the robot (RT), and at a second end (252) to a second anchoring point (A2) present in the drive pulley (23), in such a way that the second cable (25) is partly wound about the second pulley (22) within a portion of the second annular groove (220) and a part of the second cable (25) is wound about the drive pulley (23) within a portion of the fourth annular groove (232).

In this way, when the drive pulley (23) is activated in rotation about the respective third rotation axis (R3) in a first rotation direction (N1) (see FIG. 3, unbroken arrow), the first cable (24) is pulled (unbroken arrows in FIG. 3) so as to wind about the drive pulley (23) within the third annular groove (231) while the second cable (25) is unwound from the drive pulley (23) (unbroken arrows in FIG. 3), and the carriage (1) that bears the robot (RT) is thus translated on the guide rail (10) along the translation direction (Z) in a first translation direction (Z1), and when the drive pulley (23) is activated in rotation about the respective third rotation axis (R3) in a second rotation direction (N2) (dotted arrow visible in FIG. 3), the second cable (25) is pulled so as to wind about the drive pulley (23) within the fourth annular groove (232) (dotted arrows visible in FIG. 3) while the first cable (24) is unwound from the drive pulley (23) (dotted arrow visible in FIG. 3), and the carriage (1) that bears the robot (RT) is thus translated on the guide rail (10) along the translation direction (Z) in a second translation direction (Z2).

Therefore by activating the drive pulley in rotation in one rotation direction or the other, it is possible to move the carriage bearing the robot in translation, and thus the robot, alternatingly along the guide rail so as to position it at the pick-up and release positions of an article.

The robot can thus be translated and stopped in a position facing the position of an article which is to be picked up, or can also be translated along the guide rail so as to follow the article to be picked up while it is transported by a transport line.

The same modalities can be carried out for the release of the article either in a second release position or on a second transport line.

The movement system of the invention, based on the use of cables for the movement of the carriage which bears the robot along the guide rail, advantageously enables obviating the drawbacks present in the movement systems of the prior art described in the foregoing.

In fact, given the same conditions, regarding the load (weight of the robot to be moved, as well as the articles to be transferred), and the velocity with which the carriage bearing the robot is to be translated along the guide rail, the use of cables enables significantly reducing the overall size of the system and, at the same time, improves the noise level emitted and the fluidity of the movement.

In fact, as there are no issues with enmeshing and dimensioning between the cogs of the cogged belt and the teeth of the pulleys, the carriage which bears the robot can be translated along the guide rail in a fluid and linear way, without sharp jumps or jolts; further, the change in translation direction of the carriage which bears the robot along the guide rail can be done sharply simply by changing the rotation direction of the drive pulley.

Further, the use of the cables for the movement of the carriage which bears the robot along the guide rail enables a drastic reduction in any repercussions on the movement of the carriage in the case of presence of any alignment errors between the pulleys on which the cables wind, as well as a reduction in alignment errors between the pulleys and the guide rail.

Further advantageous aspects of the movement system proposed by the present invention are described in the following.

In a preferred aspect, the drive pulley (23) is dimensioned in such a way that the respective primitive circumference has a length greater than the length of the guide rail (10) which defines the entity of the linear translation travel for the carriage (1) that bears the robot (RT).

The first pulley (21), the second pulley (22) and the drive pulley (23) are reciprocally arranged with respect to one another in such a way that the third rotation axis (R3) of the drive pulley (23) is in a vertical plane that is equidistant from the vertical planes containing respectively the first rotation axis (R1) of the first pulley (21) and the second rotation axis (R2) of the second pulley (22).

More in particular, the first pulley (21), the second pulley (22), the drive pulley (23) and the guide rail (10) are reciprocally arranged in such a way that, when the carriage (1) that bears the robot (10) is positioned at a median point of the length of the guide rail (10) (see FIG. 3), the carriage (1) is located at a position that is equidistant from the first pulley (21) and the second pulley (22), with the third rotation axis (R3) of the drive pulley (23) and the median point of the length of the guide rail (10) being located in a same vertical plane.

In this way the movement system is perfectly balanced.

In this regard, the first cable (24) and the second cable (25) are dimensioned in such a way as to have a respective length such that, when the carriage (1) that bears the robot (10) is positioned at a median point of the length of the guide rail (10), the first cable (24) has a winding portion within the third annular groove (231) which is wound in the third annular groove (231) for at least or more than 180° degrees, on the opposite side of the third rotation axis (R3) of the drive pulley (23) with respect to the first rotation axis (R1) of the first pulley (21), and the second cable (25) has a winding portion within the fourth annular groove (232) which is wound in the fourth annular groove (232) for at least or more than 180° degrees, on the opposite side of the third rotation axis (R3) of the drive pulley (23) with respect to the winding portion of the first cable (24) and with respect to the second rotation axis (R2) of the second pulley (22).

Owing to this particular configuration, the two cables, when they wind/unwind on and off the relative pulleys and on and from the drive pulley, will always bend in the same way, i.e. they will always be subjected to a same flexion, without incurring any counter-flexion.

Consequently, during the movement of the cables following the activation in rotation of the drive pulley, the internal parts of the cables which are in contact with the pulleys will always be subject to a compression stress while the external parts of the cables will always be subjected to traction stresses.

This will enable limiting the onset of any wear on the cables, meaning they will have a longer working life.

In a further preferred aspect, the first pulley (21), the second pulley (22) and the drive pulley (23) are reciprocally arranged in such a way that the first annular groove (210) of the first pulley (21) and the third annular groove (231) of the drive pulley (23) are arranged on a same first vertical plane perpendicular to the first rotation axis (R1) of the first pulley (21) and to the third rotation axis (R3) of the drive pulley (23), and that the second annular groove (220) of the second pulley (22) and the fourth annular groove (232) of the drive pulley (23) are arranged on a same second vertical plane perpendicular to the second rotation axis (R2) of the second pulley (22) and to the third rotation axis (R3) of the drive pulley (23).

From the above description, it is clear how the movement system of the present invention, which uses cables for the translational movement system of a pick and place, or anthropomorphic robot, along a translation direction, advantageously enables obviating the drawbacks present in the movement systems of the prior art, which are instead based on the use of chains or belts wound on relative pulleys or cogged wheels.

The invention claimed is:

1. A movement system (100) of a robot (RT) of the pick and place, or anthropomorphic, type, for moving the robot (RT) in alternating translation along a translation direction (Z), comprising:

a carriage (1) that bears the robot (RT);

a longitudinal sliding guide rail (10), the carriage (1) that bears the robot (RT) being mounted slidably on the guide rail (10), movement means (2), configured and arranged to move the carriage (1) that bears the robot (RT), and thus the robot, in alternating translation along the guide rail (10) and thus along a translation direction (Z), the movement means (2) comprising: a first pulley (21) mounted idle about a first rotation axis (R1); a second pulley (22) mounted idle about a second rotation axis (R2); the first pulley (21) being arranged in proximity of a first end (11) of the guide rail (10) and the second pulley (22) being arranged in proximity of a second end (12) of the guide rail (10);

a drive pulley (23) activatable in rotation about a third rotation axis (R3), arranged inferiorly of the guide rail (10) and with the respective third rotation axis (R3) parallel to the first rotation axis (R1) of the first pulley (21) and the second rotation axis (R2) of the second pulley (22);

wherein the first pulley (21) and the second pulley (22) being arranged with the respective first rotation axis (R1) and second rotation axis (R2) parallel to one another and contained in a horizontal plane parallel to the guide rail (10), wherein the first pulley (21) is conformed to comprise a first annular groove (210) coaxial to the first rotation axis (R1);

wherein the second pulley (22) is conformed to comprise a second annular groove (220) coaxial to the second rotation axis (R2);

wherein the drive pulley (23) is conformed to comprise a third annular groove (231) and a fourth annular groove (232), parallel to one another and coaxial to the third rotation axis (R3);

wherein the movement means (2) further comprise:

a first cable (24), constrained at a respective first end (241) to a first point of the carriage (1) that bears the robot (RT) and at a second end (242) to a first anchoring point (A1) present in the drive pulley (23), the first cable (24) is partly wound about the first pulley (21) within a portion of the first annular groove (210) and a part of the first cable (24) is wound about the drive pulley (23) within a portion of the third annular groove (231);

a second cable (25), constrained at a respective first end (251) to a second point of the carriage (1) that bears the robot (RT), opposite the first point with respect to the robot (RT), and at a second end (252) to a second anchoring point (A2) present in the drive pulley (23), the second cable (25) is partly wound about the second pulley (22) within a portion of the second annular groove (220) and a part of the second cable (25) is wound about the drive pulley (23) within a portion of the fourth annular groove (232);

wherein when the drive pulley (23) is activated in rotation about the respective third rotation axis (R3) in a first rotation direction (N1), the first cable (24) is pulled so as to wind about the drive pulley (23) within the third annular groove (231) while the second cable (25) is unwound from the fourth annular groove (232) of the drive pulley (23), and the carriage (1) that bears the robot (RT) is thus translated on the guide rail (10) along the translation direction (Z) in a first transversal direction (Z1), and when the drive pulley (23) is activated in rotation about the respective third rotation axis (R3) in a second rotation direction (N2) the second cable (25) is pulled so as to wind about the drive pulley (23) within the fourth annular groove (232) while the first cable (24) is unwound from the third annular groove (231) of the drive pulley (23), and thus the carriage (1) that bears the robot (RT) is translated on the guide rail (10) along the translation direction (Z) in a second translation direction (Z2); and wherein the first cable (24) and the second cable (25) are dimensioned to have a respective length such that, when the carriage (1) that bears the robot (RT) is positioned at a median point of the length of the guide rail (10), the first cable (24) has a winding portion within the third annular groove (231) which is wound in the third annular groove (231) for more than 180° degrees, on the opposite side of the third rotation axis (R3) of the drive pulley (23) with respect to the first rotation axis (R1) of the first pulley (21), and the second cable (25) has a winding portion within the fourth annular groove (232) which is wound in the fourth annular groove (232) for more than 180° degrees, on the opposite side of the third rotation axis (R3) of the drive pulley (23) with respect to the winding portion of the first cable (24) and with respect to the second rotation axis (R2) of the second pulley (22).

2. The movement system (100) of claim 1, wherein the drive pulley (23) is dimensioned so that the respective primitive circumference has a length greater than the length of the guide rail (10) which defines the entity of the linear translation travel for the carriage (1) that bears the robot (RT).

3. The movement system (100) of claim 1, wherein the first pulley (21), the second pulley (22) and the drive pulley (23) are reciprocally arranged with respect to one another so that the third rotation axis (R3) of the drive pulley (23) is in a vertical plane that is equidistant from the vertical planes containing respectively the first rotation axis (R1) of the first pulley (21) and the second rotation axis (R2) of the second pulley (22).

4. The movement system (100) of claim 1, wherein the first pulley (21), the second pulley (22), the drive pulley (23) and the guide rail (10) are reciprocally arranged so that, when the carriage (1) that bears the robot (10) is positioned at a median point of the length of the guide rail (10), the carriage (1) is located at a position that is equidistant from the first pulley (21) and the second pulley (22), with the third rotation axis (R3) of the drive pulley (23) and the median point of the length of the guide rail (10) being located in a same vertical plane.

5. The movement system (100) of claim 1, wherein the first pulley (21), the second pulley (22) and the drive pulley (23) are reciprocally arranged so that the first annular groove (210) of the first pulley (21) and the third annular groove (231) of the drive pulley (23) are arranged on a same first vertical plane perpendicular to the first rotation axis (R1) of the first pulley (21) and to the third rotation axis (R3) of the drive pulley (23), and that the second annular groove (220) of the second pulley (22) and the fourth annular groove (232) of the drive pulley (23) are arranged on a same second vertical plane perpendicular to the second rotation axis (R2) of the second pulley (22) and to the third rotation axis (R3) of the drive pulley (23).

6. A movement system (100) of a robot (RT) of the pick and place, or anthropomorphic, type, for moving the robot (RT) in alternating translation along a translation direction (Z), comprising:

a carriage (1) that bears the robot (RT);

a longitudinal sliding guide rail (10), the carriage (1) that bears the robot (RT) being mounted slidably on the guide rail (10), movement means (2), configured and arranged to move the carriage (1) that bears the robot (RT), and thus the robot, in alternating translation along the guide rail (10) and thus along a translation direction (Z), the movement means (2) comprising: a first pulley (21) mounted idle about a first rotation axis (R1); a second pulley (22) mounted idle about a second rotation axis (R2); the first pulley (21) being arranged in proximity of a first end (11) of the guide rail (10) and the second pulley (22) being arranged in proximity of a second end (12) of the guide rail (10);

a drive pulley (23) activatable in rotation about a third rotation axis (R3), arranged inferiorly of the guide rail (10) and with the respective third rotation axis (R3) parallel to the first rotation axis (R1) of the first pulley (21) and the second rotation axis (R2) of the second pulley (22);

wherein the first pulley (21) and the second pulley (22) being arranged with the respective first rotation axis (R1) and second rotation axis (R2) parallel to one another and contained in a horizontal plane parallel to the guide rail (10), wherein the first pulley (21) is conformed to comprise a first annular groove (210) coaxial to the first rotation axis (R1);

wherein the second pulley (22) is conformed to comprise a second annular groove (220) coaxial to the second rotation axis (R2);

wherein the drive pulley (23) is conformed to comprise a third annular groove (231) and a fourth annular groove (232), parallel to one another and coaxial to the third rotation axis (R3);

wherein the movement means (2) further comprise:

a first cable (24), constrained at a respective first end (241) to a first point of the carriage (1) that bears the robot (RT) and at a second end (242) to a first anchoring point (A1) present in the drive pulley (23), the first cable (24) is partly wound about the first pulley (21) within a portion of the first annular groove (210) and a part of the first cable (24) is wound about the drive pulley (23) within a portion of the third annular groove (231);

a second cable (25), constrained at a respective first end (251) to a second point of the carriage (1) that bears the robot (RT), opposite the first point with respect to the robot (RT), and at a second end (252) to a second anchoring point (A2) present in the drive pulley (23), the second cable (25) is partly wound about the second pulley (22) within a portion of the second annular groove (220) and a part of the second cable (25) is wound about the drive pulley (23) within a portion of the fourth annular groove (232);

wherein when the drive pulley (23) is activated in rotation about the respective third rotation axis (R3) in a first rotation direction (N1), the first cable (24) is pulled so as to wind about the drive pulley (23) within the third annular groove (231) while the second cable (25) is unwound from the fourth annular groove (232) of the drive pulley (23), and the carriage (1) that bears the robot (RT) is thus translated on the guide rail (10) along the translation direction (Z) in a first transversal direction (Z1), and when the drive pulley (23) is activated in rotation about the respective third rotation axis (R3) in a second rotation direction (N2) the second cable (25) is pulled so as to wind about the drive pulley (23) within the fourth annular groove (232) while the first cable (24) is unwound from the third annular groove (231) of the drive pulley (23), and thus the carriage (1) that bears the robot (RT) is translated on the guide rail (10) along the translation direction (Z) in a second translation direction (Z2); and wherein the first pulley (21), the second pulley (22) and the drive pulley (23) are reciprocally arranged so that the first annular groove (210) of the first pulley (21) and the third annular groove (231) of the drive pulley (23) are arranged on a same first vertical plane perpendicular to the first rotation axis (R1) of the first pulley (21) and to the third rotation axis (R3) of the drive pulley (23), and that the second annular groove (220) of the second pulley (22) and the fourth annular groove (232) of the drive pulley (23) are arranged on a same second vertical plane perpendicular to the second rotation axis (R2) of the second pulley (22) and to the third rotation axis (R3) of the drive pulley (23).

7. The movement system (100) of claim 6, wherein the drive pulley (23) is dimensioned so that the respective primitive circumference has a length greater than the length of the guide rail (10) which defines the entity of the linear translation travel for the carriage (1) that bears the robot (RT).

8. The movement system (100) of claim 6, wherein the first pulley (21), the second pulley (22) and the drive pulley (23) are reciprocally arranged with respect to one another so that the third rotation axis (R3) of the drive pulley (23) is in a vertical plane that is equidistant from the vertical planes containing respectively the first rotation axis (R1) of the first pulley (21) and the second rotation axis (R2) of the second pulley (22).

9. The movement system (100) of claim 6, wherein the first pulley (21), the second pulley (22), the drive pulley (23) and the guide rail (10) are reciprocally arranged so that, when the carriage (1) that bears the robot (10) is positioned at a median point of the length of the guide rail (10), the carriage (1) is located at a position that is equidistant from the first pulley (21) and the second pulley (22), with the third rotation axis (R3) of the drive pulley (23) and the median point of the length of the guide rail (10) being located in a same vertical plane.

10. The movement system (100) of claim 6, wherein the first cable (24) and the second cable (25) are dimensioned to have a respective length such that, when the carriage (1) that bears the robot (RT) is positioned at a median point of the length of the guide rail (10), the first cable (24) has a winding portion within the third annular groove (231) which is wound in the third annular groove (231) for more than 180° degrees, on the opposite side of the third rotation axis (R3) of the drive pulley (23) with respect to the first rotation axis (R1) of the first pulley (21), and the second cable (25) has a winding portion within the fourth annular groove (232) which is wound in the fourth annular groove (232) for more than 180° degrees, on the opposite side of the third rotation axis (R3) of the drive pulley (23) with respect to the winding portion of the first cable (24) and with respect to the second rotation axis (R2) of the second pulley (22).

* * * * *